Feb. 27, 1968     P. A. WILKS, JR     3,370,502
FRUSTRATED MULTIPLE INTERNAL REFLECTION ROD WITH
VARIABLE LENGTH FLUID CONTAINING ENCLOSURE MEANS
Filed Nov. 5, 1963

INVENTOR
PAUL A. WILKS, JR.
BY
Robertson & Smythe
ATTORNEYS

United States Patent Office 3,370,502
Patented Feb. 27, 1968

3,370,502
FRUSTRATED MULTIPLE INTERNAL REFLECTION ROD WITH VARIABLE LENGTH FLUID CONTAINING ENCLOSURE MEANS
Paul A. Wilks, Jr., Darien, Conn., assignor to Wilks Scientific Corporation, Norwalk, Conn., a corporation of Connecticut
Filed Nov. 5, 1963, Ser. No. 321,498
1 Claim. (Cl. 88—14)

ABSTRACT OF THE DISCLOSURE

An absorption cell means having a rod with a cell surrounding the rod, radiant energy being directed at one end of the rod means and passing down the rod with frustrated multiple internal reflection.

---

This invention relates to an absorption cell for use in conjunction with infrared, ultra-violet or visible radiant energy studies of a material wherein "frustrated multiple internal reflection" is employed.

It is known to transmit infrared rays by internal reflection through a flat plate having ends at an angle other than 90° to its side or through a bent rod with flat ends, but neither are convenient for use as absorption cells in spectroscopy. They are difficult to construct, especially the bent rod.

One of the objects of the present invention is to provide an absorption cell which conveniently can be used in the detection of composition of material.

In one aspect of the invention, a source of radiant energy, such as infrared or ultra-violet can be used. A lens system is used to direct energy rays from said source onto a substantially straight rod. Alternatively, an internal conical mirror arrangement can be used at the end of the rod to direct incoming rays onto the ends surface of the rod and substantially at right angles thereto. The rod is of a radiant energy transmitting material such as sodium chloride, thallium bromide iodide or sapphire. The rod in one form has conical end faces angularly disposed relative to the axis of the rod. The rays must strike the face at greater than the critical angle and must strike the side walls of the rod at less than the critical angle. Thus, the radiant energy rays directed onto an end surface substantially at right angles thereto will be internally reflected along the longitudinal axis of the rod a plurality or multiple number of times. All of the rays admitted to the rod are internally reflected, a minimum thereof travelling axially without internal reflection. The material of interest is brought into contact with the longitudinal surface or walls of the rod. Energy will be diffused therefrom in accordance with the material to be determined. Such may be termed "multiple internal frustrated reflection."

The energy passing out of the rod from the exit end is received by an indicating or recording device such as a spectrophotometer, filter, grating or other means for isolating wavelengths of energy of interest.

The principal aspect of the arrangement is the employment of a straight rod having surfaces at the entering and exit ends of the rod which are angularly disposed relative to the longitudinal axis thereof. Preferably, the ends are conical and so related to the radiant energy source and the energy receiving means that the rays will be substantially perpendicular thereto.

In a further aspect of the invention, the rod may have its effective length adjustable so as to permit nulling or calibration of the arrangement with ease. This may be accomplished by a sliding tube arrangement over the rod so that the sample chamber length can be changed.

These and other objects, advantages and features of the invention will become apparent from the following description and drawings which are merely exemplary.

Figure 1:
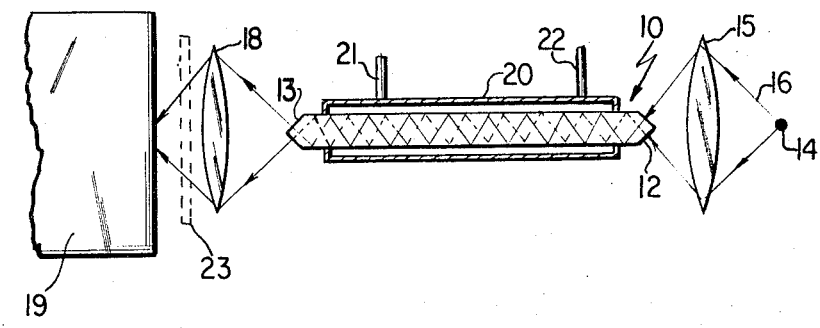
FIG. 1 is a schematic sectional view of one form of the invention.

Referring to FIG. 1, the radiant energy transmitting straight rod 10 can be suitably held by a support (not shown). The radiant energy transmitting cylinder or rod can be made of sodium chloride, thallium bromide iodide, germanium, sapphire or other similar infrared or radiant energy transmitting material. In the form shown, the energy transmitting means 10 has a conical end surface 12 for receiving radiant energy rays from radiant energy source 14, said surface being angularly disposed relative to the longitudinal axis of the rod. A source of radiant energy 14 is suitably located relative to lens 15 so as to direct rays 16 in a direction substantially perpendicular to the faces of the conical end 12.

The energy rays will then be reflected from the interior side surfaces of the cylinder or rod 10 a plurality of times until the rays reach the exit end conical surface 13, said end surface being angularly disposed relative to the longitudinal axis of the guide means. The energy rays will pass out of the guide means 10 through surface 13 in a direction perpendicular to exit 13. The energy rays passing from face 13 will then be redirected by lens 18 to a suitable recording or indicating instrument 19. A filter or grating 23 may alternatively be employed so as to select the wavelength of energy desired.

The material to be determined may be introduced into the chamber 20 through pipe 21 and exhausted through pipe 22. Energy will be diffused from the longitudinal walls of the guide means according to the material in the fluid and the chamber surrounding the rod.

The rod and cells can be calibrated and used singly or can be used in pairs. In the latter instance, one cell would serve as the standardizing cell.

Figure 2:
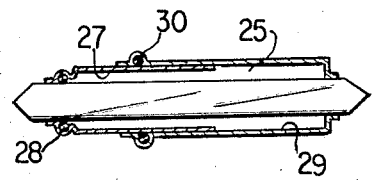
FIG. 2 shows a transmitting means similar to FIG. 1 with the exception that the transmitting material receiving cell is adjustable.

In order to assist in calibration, the walls of chamber 25 (FIG. 2) can be arranged in telescoping relation. Rod 26 has chamber or cell wall 27 mounted thereon, an O-ring 28 being provided to insure a tight joint relative thereto as the wall or tube 27 is adjustably slid thereon. Wall or tube 29 is sealed to the other end of the guide means 26. An O-ring 30 is used in order to seal walls 27 and 28 relative to each other.

Figure 3:
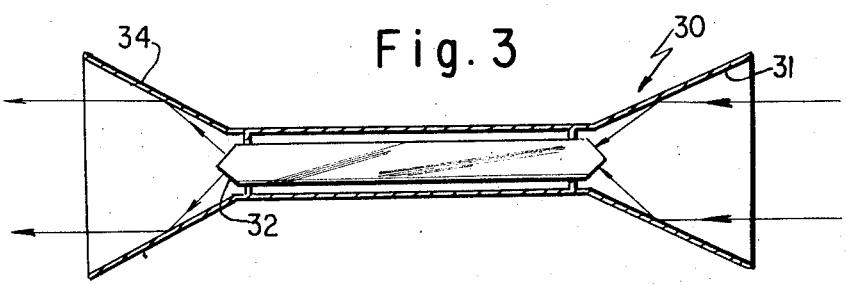
FIG. 3 is a schematic showing of another form of the invention.

In FIG. 3, a cone 30 whose inner walls 31 are reflective is used to direct the incoming rays to the end 32 substantially perpendicular to the end surface thereof. This arrangement is particularly suited for incoming parallel rays such as in spectrophotometers. The exit end 33 has a similar cone 34 for directing the rays to an indicating or recording portion of the spectrophotometer.

It should be apparent that details of construction can be varied without departing from the spirit of the invention except as defined in the appended claims.

What is claimed:
1. In a device for determining the composition of fluid material, the combination of a source of radiant energy rays, radiation transmitting cylindrical rod means for receiving and conducting said energy rays along a path therein having a plurality of internal reflections, said rod means having conical ray receiving surface means at one end thereof angularly disposed relative to the longitudinal axis of said rod means and conical ray directing surface means at the other end thereof angularly disposed relative to the longitudinal axis of said rod means, said ray directing and receiving surfaces disposed normal to the direction of the incident rays, cell means comprising first and second cylindrical cooperating conduit means having walls spaced from and parallel to said rod, and first conduit means having an end wall fixedly connected to said rod adjacent one end thereof, said second conduit means having a smaller diameter than said first conduit means for sliding within said first conduit means, sealing ring means located on the end of said second conduit means in sliding contact with said rod and intermediate said conduits to maintain a fluid seal, said conduits forming an enclosure in which a sample of said fluid material may be contained and slidably cooperating to adjust the length of said cell relative to said rod, and in indicating means for receiving energy rays from said rod means for providing an indication of the material in said cell means.

References Cited

UNITED STATES PATENTS

| 2,569,127 | 9/1951 | Eltenton | 88—14 |
| 2,692,952 | 10/1954 | Briggs | 88—1 |
| 2,745,310 | 5/1956 | Horn | 88—1 |

OTHER REFERENCES

Bell Laboratories Record, vol. 40, p. 62, February 1962, New Infrared Spectroscopic Technique.

JEWELL H. PEDERSEN, *Primary Examiner.*

B. LACOMIS, *Assistant Examiner.*